Dec. 1, 1970 R. A. McCONNELL 3,544,922
IMPEDANCE MATCHING COUPLER SYSTEM FOR
A VARIABLE RESISTIVE LOAD IMPEDANCE
Filed April 4, 1969
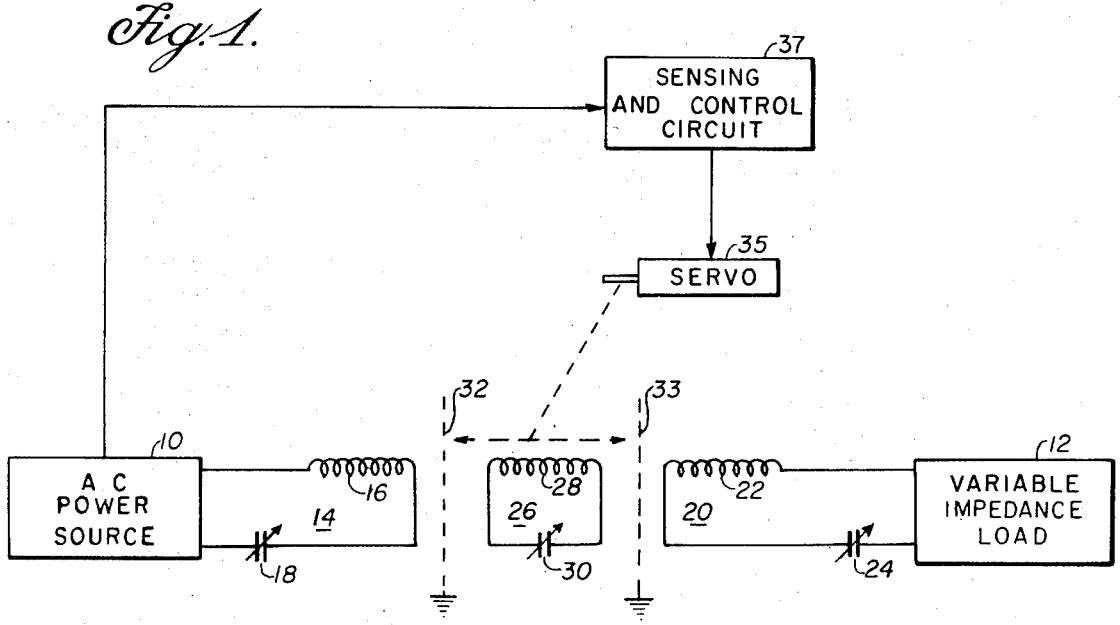
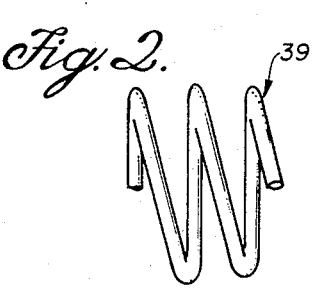
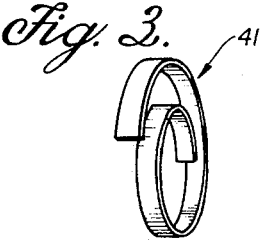
INVENTOR.
ROGER A. McCONNELL
BY
ATTORNEY United States Patent Office 3,544,922
Patented Dec. 1, 1970

1

3,544,922
IMPEDANCE MATCHING COUPLER SYSTEM FOR
A VARIABLE RESISTIVE LOAD IMPEDANCE
Roger A. McConnell, Portola Valley, Calif., assignor to
the United States of America as represented by the
United States Atomic Energy Commission
Filed Apr. 4, 1969, Ser. No. 813,486
Int. Cl. H04b 3/04; H03h 7/38
U.S. Cl. 333—17                                      6 Claims

ABSTRACT OF THE DISCLOSURE

A coupler system for efficiently coupling power from a radio-frequency source to a varying resistive load, including a series tuned input circuit connected to the source, a series tuned output circuit connected to the load and a tuned linking circuit having a single inductance coupled to input and output circuit inductances such that the sum of the coefficients of coupling remains constant and the circuits remain tuned when the linking inductance is moved with a servo into greater or less flux linkage with the input and output circuit inductances to match the load impedance to the source.

The invention disclosed herein was made under, or in, the course of Contract No. AT(04–3)–400 with the United States Atomic Energy Commission.

BACKGROUND OF THE INVENTION

The invention relates to AC power couplers and more particularly, it relates to a coupler system for matching a variable impedance resistive load to a radio-frequency power source over a wide range of load impedances.

In a particle accelerating device, for example, an electron-positron storage ring, there are transition periods during which the device is brought from low power to full power. During such periods the accelerating device presents a varying impedance. Consequently, to efficiently transfer power from a source to the device under changing load impedance conditions, it is necessary to constantly adjust coupling circuits so as to match the load to the source. In the past it has been necessary to utilize large variable inductors having sliding contacts. However, the level of power supplied to large accelerating devices is very high and sliding contacts tend to deteriorate rapidly with use.

SUMMARY OF THE INVENTION

In brief, the present invention is a coupler system having a tuned input circuit connected to a radio-frequency power source, a tuned output circuit for connection to a variable load impedance, and a tuned coupling circuit that links the input and output circuits with inductive couplings that are variable simultaneously in response to variations in the load impedance to complementarily increase and decrease the inductive couplings. The couplings are made to be symmetrical so that the sum of the coefficients of coupling is equal to a constant to thereby keep the mutual inductance coupled from the input and output circuits into the linking circuit, a constant also. Both the input and output circuits are thereby automatically maintained in tune under changing load impedance conditions to match the load to the source.

It is an object of the invention to efficiently transfer power from a radio-frequency source to a variable impedance load over a wide range of load impedances.

Other objects and advantageous features of the invention will be apparent in a description of a specific embodiment thereof, given by way of example only, to enable one skilled in the art to readily practice the invention, and described hereinafter with reference to the accompanying drawing.

BRIEF DESCRIPTION OF THE DRAWING

FIG. 1 is a diagram of a radio-frequency power source coupled to a variable impedance load by means of an impedance matching coupler system according to the invention.

FIG. 2 is a view of an air core solenoid useful in the system of FIG. 1.

FIG. 3 is a view of a flat spiral wound coil that may be used in the system of FIG. 1.

DESCRIPTION OF AN EMBODIMENT

Referring to the drawing there is shown in FIG. 1 a coupling system for efficiently transferring power from a radio-frequency power source 10 to a variable impedance load 12 over a wide range of resistive load impedances at the load 12. The coupling system is comprised of an input circuit 14 including an inductance 16 and a variable capacitance 18. The coupling system also includes an output circuit 20 comprising an inductance 22 and a variable capacitance 24 serially connected across the input to the load 12. The inductances 16 and 22 are made to be substantially identical in spacing, dimensions, turns and material for reasons indicated hereinafter. The input circuit 14 is coupled to the output circuit 20 by means of a linking circuit 26 which is comprised of an inductance 28 and a variable capacitance 30. The inductance 28 is inductively coupled to both the input circuit inductance 16 and the output circuit inductance 22, and for convenience the inductance 28 may be a single inductance. The inductances 16, 22 and 28 are of the air core type and are axially aligned. The inductances 16 and 22 are spaced apart and mounted stationary with respect to the inductance 28 which is mounted between inductances 16 and 22 and made to be movable therebetween.

The coupling system is initially adjusted by electrically removing the circuit 26 from the system and then adjusting the input circuit 14 to a condition of resonance at the source frequency by adjustment of the capacitor 18. The output circuit 20 with a load impedance equal to the source impedance is also adjusted to a condition of resonance at the source frequency by means of the capacitor 24 with the linking circuit 26 electrically removed. The linking circuit 26 is then electrically inserted in the coupling system so that the inductances 16 and 28 are inductively coupled and the inductances 28 and 22 are inductively coupled. The coefficient of coupling between the inductances 16 and 28 may be designated as $k_1$ and the coefficient of coupling between the inductance 28 and 22 may be designated as $k_2$. The inductance 28 is then physically positioned at equal distances from the inductances 16 and 22. The coefficients of coupling $k_1$ and $k_2$ are thereby made equal provided the inductances 16 and 22 are made to be substantially identical in spacing, dimensions, turns and material. With $k_1$ equal to $k_2$ the circuit 26 is adjusted to resonate at the source frequency.

In operation, the circuits 14, 26 and 20 are adjusted to a condition of zero reactance. Any reactance at the load 12 is tuned out of the load by conventional means so that only the resistive component of the load is matched to the power source 10 according to the following formulas:

$$k_1/k_2 = (R_S/R_L)^{1/2}$$

$$k_1 + k_2 = \text{a constant} = 2k$$

$$k_1 = \frac{2k}{\left(\frac{R_L}{R_S}\right)^{1/2} + 1}$$

and $$k_2 = \frac{2k}{\left(\frac{R_L}{R_S}\right)^{1/2} + 1}$$

Where $R_S$ is the resistance of the source and $R_L$ is the resistance of the load; and $2k$ is a constant that is equal to the sum of the coefficients of couplings $k_1$ and $k_2$. By operating according to the above conditions, the sum of the mutual inductance from the circuits 14 and 20 into the circuit 26 remains a constant and the circuits remain tuned for a wide range of resistive load impedances; and by remaining tuned as $k_1$ and $k_2$ are varied, the source is matched to the load. For a more complete discussion and justification of the theoretical basis of the invention, reference is made to a paper by R. McConnell "A High Power Coupler for the SLAC Storage Ring Cavity" SLAC-TN-68-4, Leland Stanford Jr. University, Stanford, Calif.

The sum of coefficients coupling of the inductances 16 and 22 with the inductance 28 is made a constant by making the inductances 16 and 22 substantially identical and then maintaining the sum of the distances from the inductance 28 to the inductances 16 and 22 equal to a constant by keeping the inductances 16 and 22 stationary and moving the inductance 28 therebetween. The positioning of the coil 28 may be accomplished manually in accordance with meter readings taken in the input transmission line to the coupler. However, it is convenient to provide automatic means of a conventional type for positioning the coil. Such means may include a servo motor 35 for moving the coil 28 to automatically adjust its inductive coupling with the coils 16 and 22. The sensing and control circuit 37 is connected to the power source 10 for detecting variations in the load impedance reflected to the source 10. For example, should there be a rise in the load impedance this rise will be reflected to the source 10, detected by the circuit 37 which then drives the servo 35 to move the coil 28 towards the coil 22 thereby increasing the coupling between the coils 22 and 28 and complementarily decreasing the coupling between the coils 16 and 28 to again match the load to the source.

The coils 16, 28 and 22 may be of the form of the coil 39 shown in FIG. 2. The coil 39 is in the form of an air core solenoid which has a maximum coefficient of coupling of approximately 0.35.

A second type of coil configuration that may be used for the coils 16, 28 and 22 is illustrated in the FIG. 3 wherein a coil 41 is shown that is wound from a flat spiral conductor. Such a configuration makes possible a longer distance of travel between the coils and gives better coefficients of couplings, thereby increasing the range of impedances that can be matched. Another advantage of the coil 41 is that it can be adjusted to self resonance by utilizing the rather large capacity between turns of the flat spirals. The capacity of the coil 41 may be adjusted to resonate with the coil inductance by trimming the length of the spiral or by using a shorting bar.

To ensure impedance matching, especially with the coupling system in an unsymmetrical condition, the capacitive coupling between the inductance 28 and the inductances 16 and 22 may be reduced by the addition of Faraday shields 32 and 33 positioned between the inductances.

A coupling system exemplifying the invention was constructed for delivering five watts to a resistive load with an insertion loss of 0.4 db. With a 50 ohm load the coupler was adjusted to provide unity coupling to a source having a 50 ohm input impedance. The coupler reduced the mismatch of a 50 ohm source with a 500 ohm load from 10 to 1 to 1.2 to 1. A high power motor driven model of the coupler system was also constructed and tested to transfer 35 kilowatts of power at 50 mHz. With an insertion loss of less than 0.1 db., the units coupling attained when operating into a 50 ohm load; and when operating into a 150 ohm load, a 3 to 1 mismatch was reduced to 1.2 to 1.

While an embodiment of the invention has been shown and described, further embodiments or combinations of those described herein will be apparent to those skilled in the art without departing from the spirit of the invention.

I claim:

1. In a coupled system for coupling a radio-frequency source having a predetermined frequency to a variable impedance resistive load, the combination of:
   (a) an input circuit comprising a first inductance and capacitance, said input circuit being connected to said source and tuned to said predetermined frequency;
   (b) an output circuit comprising a second inductance and capacitance, said output circuit being connected to said load and tuned to said predetermined frequency, said first inductance and said second inductance being substantially equal;
   (c) a linking circuit comprising a third inductance and capacitance, said linking circuit being tuned to said predetermined frequency, said third inductance being inductively coupled to said first and second inductances; and
   (d) means for adjusting the coupling between said third inductance and said first and second inductances under a variation of resistive impedance of said load to match said load to said source, said adjusting means maintaining said input circuit, said output circuit and said linking circuit in tune by keeping the sum of the coefficients of coupling between said third inductance and said first and second inductances equal to a constant.

2. The combination of claim 1 said input circuit and said output circuit are series tuned circuits.

3. The combination of claim 1 further including a first Faraday shield mounted between said first and third inductances and a second Faraday shield mounted between said second and third inductances.

4. The combination of claim 1 wherein said first and second inductances are air core coils and said third inductance is comprised of a single continuous air core coil axially aligned with said first and second inductances.

5. The combination of claim 4 wherein said first, second and third inductances are flat conductors wound in flat spirals.

6. The combination of claim 4 wherein said first and second inductances are substantially identically constructed in spacing, dimensions, turns and material and said third inductance is mounted for axial adjustment with respect to said first and second inductances to maintain the sum of distances between said first and third inductance and said second and third inductance constant for all adjustments of said third inductance.

References Cited

UNITED STATES PATENTS

| | | | |
|---|---|---|---|
| 2,832,934 | 4/1958 | Walters | 333—17 |
| 3,160,832 | 12/1964 | Beitman et al. | 333—17 |
| 3,355,667 | 11/1967 | Bruene | 333—17X |

HERMAN KARL SAALBACH, Primary Examiner

T. VEZEAU, Assistant Examiner

U.S. Cl. X.R.

333—32